(12) United States Patent
Platek et al.

(10) Patent No.: US 9,053,491 B2
(45) Date of Patent: Jun. 9, 2015

(54) PRODUCT EVALUATION SYSTEM AND PRODUCT EVALUATION METHOD

(71) Applicant: eLADY Limited, Tokyo (JP)

(72) Inventors: Nir Platek, Tokyo (JP); Takahide Sakagami, Hyogo (JP); Shigenori Yuyama, Tokyo (JP)

(73) Assignee: eLADY Limited, Tokyo (JP)

( * ) Notice: Subject to any disclaimer, the term of this patent is extended or adjusted under 35 U.S.C. 154(b) by 0 days.

(21) Appl. No.: 14/338,395

(22) Filed: Jul. 23, 2014

(65) Prior Publication Data

US 2014/0337105 A1 Nov. 13, 2014

Related U.S. Application Data

(63) Continuation of application No. 11/865,975, filed on Oct. 2, 2007.

(51) Int. Cl.
*G06Q 30/00* (2012.01)
*G06Q 30/02* (2012.01)
(Continued)

(52) U.S. Cl.
CPC ........ *G06Q 30/0206* (2013.01); *G06Q 30/0278* (2013.01); *G06Q 10/08* (2013.01); *G06Q 30/02* (2013.01); *G06Q 30/0601* (2013.01)

(58) Field of Classification Search
CPC ................................................. G06Q 30/0278
USPC ......................................................... 705/306
See application file for complete search history.

(56) References Cited

U.S. PATENT DOCUMENTS 5,696,279 A 12/1997 Berthe et al.
5,825,668 A 10/1998 Nakao
(Continued)

FOREIGN PATENT DOCUMENTS

JP 08-138108 5/1996
JP 2001-290965 10/2001
(Continued)

OTHER PUBLICATIONS

Extended European Search Report dated Jun. 20, 2012 (6 pages).
(Continued)

*Primary Examiner* — Nicholas D Rosen
(74) *Attorney, Agent, or Firm* — Lowe Hauptman & Ham, LLP

(57) ABSTRACT

A product evaluation system and a product evaluation method allow people to quickly, inexpensively, and accurately evaluate large amounts of products including those that do not have information attached in advance in the manufacturing stage. The system comprises an I/O component that functions as a product identification mechanism that identifies product type including at least one of product, product group, product brand, or product category, a characteristic acquisition mechanism that acquires characteristic information of the product, an evaluator that performs authentication and value estimations of products, and a data store that stores information related to the product. The evaluation mechanism performs authentication and value estimations of products based on characteristic information of the product acquired by the characteristic acquisition mechanism, and genuine product characteristic information, counterfeit product characteristic information, and value information and market information for each condition included in the information related to products stored in the data store.

12 Claims, 11 Drawing Sheets

(51) Int. Cl.
*G06Q 10/08* (2012.01)
*G06Q 30/06* (2012.01)

(56) References Cited

U.S. PATENT DOCUMENTS

| | | | |
|---|---|---|---|
| 7,352,449 B2 | 4/2008 | Kawase et al. | |
| 7,972,859 B2 | 7/2011 | Eastwood et al. | |
| 8,081,304 B2 | 12/2011 | Furness, III et al. | |
| 8,706,645 B2 * | 4/2014 | Hendry, Jr. | 705/306 |
| 8,719,043 B2 * | 5/2014 | Polli et al. | 705/2 |
| 2002/0184135 A1 | 12/2002 | Zakaria | |
| 2004/0030565 A1 | 2/2004 | Hendry, Jr. | |
| 2005/0112115 A1 | 5/2005 | Khan | |
| 2005/0175230 A1 | 8/2005 | Kortum et al. | |
| 2005/0181695 A1 | 8/2005 | Yoshimura et al. | |
| 2005/0206892 A1 | 9/2005 | Wang et al. | |
| 2006/0104648 A1 | 5/2006 | Sasaki | |
| 2006/0222230 A1 | 10/2006 | Ishikawa | |
| 2006/0268259 A1 | 11/2006 | Park | |
| 2007/0055593 A1 | 3/2007 | Perrin et al. | |
| 2007/0086625 A1 | 4/2007 | Polli et al. | |
| 2007/0153269 A1 | 7/2007 | Wang et al. | |
| 2007/0241177 A1 | 10/2007 | Tuschel et al. | |
| 2007/0298502 A1 | 12/2007 | Eastwood et al. | |
| 2009/0089175 A1 * | 4/2009 | Platek et al. | 705/26 |
| 2009/0112101 A1 | 4/2009 | Furness et al. | |
| 2010/0208240 A1 | 8/2010 | Schowengerdt et al. | |

FOREIGN PATENT DOCUMENTS

| | | |
|---|---|---|
| JP | 2001-296802 | 10/2001 |
| JP | 2004-4495 | 1/2004 |
| JP | 2005-114413 | 4/2005 |
| JP | 2005216316 A | 8/2005 |
| JP | 2005-319724 | 11/2005 |
| JP | 2006-072402 A | 3/2006 |
| JP | 2006-119763 A | 5/2006 |
| JP | 2006-250765 | 9/2006 |
| JP | 2006-280499 A | 10/2006 |
| JP | 2006-292634 | 10/2006 |
| JP | 2007-18461 | 1/2007 |
| JP | 2007-41643 | 2/2007 |
| WO | 95/08113 | 3/1995 |
| WO | 96/07895 | 3/1996 |
| WO | 2006/050367 A2 | 5/2006 |

OTHER PUBLICATIONS

Written Opinion of the International Search Report dated Nov. 18, 2008 re PCT/JP2008/067954 (9 pages).
International Search Report dated Nov. 4, 2008 re PCT/JP2008/067954 (4 pages).
Japanese Office Action as received on Nov. 6, 2012 re 2009-536087 (4 pages).
Japanese Office Action dated Jul. 23, 2013 re 2009-536087 (3 pages).
Broad, W.J., "Forgeries Face New Arsenal of Anti-Hoax Techniques," New York Times, Late City Final Edition, col. 1, p. 3, May 10, 1983.
Olsen, B.A. et al., "Screening for Counterfeit Drugs Using Near-Infrared Spectroscopy", Pharmaceutical Technology North America, vol. 26, No. 6, pp. 62-71, Jun. 2002.
Walsh, C., "Ink Inc./ Local Company Hopes to Make its Mark With Technology Upgrade", Gazette, Bus. section, p. 1, Jul. 20, 2003.
Chiarello, K., "Fingerprinting Technology Combats Counterfeit Drugs", Pharmaceutical Technology, vol. 28, No. 8, p. 15, Aug. 2004.
Toensmeier, P.A., "Compounders Thwart Counterfeiting With Covert Additive Techniques", Plastics Engineering, vol. 61, No. 9, pp. 10-12, Sep. 2005.
Anon., "Counterfeit Drug Detection: Help is at Hand", Instrument Business Outlook, vol. 15, No. 21, p. 7, Feb. 15, 2007.
Rosen, N.D., Examiner's Affidavit, Oct. 11, 2011.

* cited by examiner

FIG. 4

Product catalog DB 31

| Identifi-cation ID | Product category | Brand name | Product group | Product name | Product number | Color | Size | Shape | Evaluation task |
|---|---|---|---|---|---|---|---|---|---|
| 0001 | Bag | Brand A | Group A1 | Bag a1 | M51551 | Brown | 20 x 20 x 10 | Square | Authentication |
| 0002 | Watch | Brand B | | Watch b1 | | | 10 x 2 x 2 | | Authentication |
| 0003 | Jewelry | | Diamond | | | | | | Value estimation |
| 0004 | Perfume | Brand D | Group D1 | Perfume d1 | G1234 | | | | Authentication |
| 0005 | Necklace | Brand E | Group E1 | | | | | | Authentication / value estimation |
| ... | ... | ... | ... | ... | ... | ... | ... | ... | ... |
| ... | ... | ... | ... | ... | ... | ... | ... | ... | ... |

FIG. 5

Characteristic acquisition method DB 32

| Identifi-cation ID | Characteristic acquisition method | Characteristic item |
|---|---|---|
| 0001 | Radiographic penetration test | Construction |
| 0001 | Fluorescent X-ray analysis | Pigment composition of pattern |
| 0001 | Fluorescent X-ray analysis | Fitting composition |
| 0001 | Ultraviolet absorption analysis | Pigment composition of pattern |
| 0001 | Visible light surface roughness measurement | Surface shape |
| 0001 | ... | ... |
| 0002 | Acoustic frequency analysis | Sounds from movement |
| ... | ... | |

FIG. 6

Genuine product characteristic DB 33

| Identification ID | Characteristic item | Genuine value |
|---|---|---|
| 0001 | Pigment composition of pattern | Component A, Component B |
| 0001 | Fitting composition | ... |
| 0002 | ... | ... |
| ... | ... | ... |

FIG. 7

Counterfeit product characteristic DB 36

| Identifi-cation ID | Characteristic item | Counterfeit value |
|---|---|---|
| 0001 | Pigment composition of pattern | Component C, Component D |
| 0001 | Fitting composition | ... |
| 0002 | ... | ... |
| ... | ... | ... |

FIG. 8

Product market value DB 38

| Identifi-cation ID | Rank | Market price |
|---|---|---|
| 0001 | S | $1,000 |
| 0001 | A | $850 |
| 0001 | B | $600 |
| 0001 | C | $400 |
| 0002 | S | $5,000 |
| 0002 | A | $4,500 |
| 0002 | B | $3,000 |
| 0002 | C | $2,000 |
| ... | ... | ... |

PRODUCT EVALUATION SYSTEM AND PRODUCT EVALUATION METHOD

CROSS REFERENCES TO RELATED APPLICATIONS

This application is a continuation application of U.S. patent application Ser. No. 11/865,975, filed on Oct. 2, 2007, the entire contents of which are hereby incorporated by reference.

BACKGROUND

The present invention relates to a product evaluation system and a product evaluation method and in particular to a product evaluation system and a product evaluation method that acquires characteristics of products and then evaluates the authenticity of the product and estimates its value. Hereafter, the word "Evaluation" shall mean "Authentication" or "Value Estimation" or a combination of the both.

In recent years, due to the growth of the recycling and secondary distribution markets for goods, used brand name products and jewelry are being widely distributed and counterfeit products are also often distributed to such markets. In particular, the increasing popularity of secondary market distribution platforms on the Internet in recent years has resulted in a significant increase in the illegal distribution of counterfeit products. As a result, there is a rising need to authenticate and estimate the value of brand name products, jewelry, and the like.

However, over the years and up until now, there have not been significant changes to evaluation methods of brand name products, jewelry, and the like. Traditionally, the evaluation of authenticity and value of products has required involvement of human beings with special expertise, and such evaluation was done by way of utilizing the five senses. Under such circumstances, it is difficult for humans who do not have special expertise to evaluate products, making it necessary to obtain significant human resources with such expertise in order to perform evaluation operations of large quantities of products. In addition, an evaluation method that depends on the five human senses requires a long time for each product and limits the number of products that can be evaluated by one person per day. Furthermore, since the evaluation depends on the special expertise and experience of an individual person, there is a possibility that the results of evaluation will vary and mistakes occur depending on the person performing the evaluation.

Therefore, various technologies have been proposed to date to attach an information storage medium, on which specific information is recorded, to the main body, packing material, or the like of products beforehand during the manufacturing stage of the products and then determine the authenticity by reading and verifying this information. For example, a technology is known consisting of attaching a wireless tag, whereon information used to identify the product is stored, to the product or the packing box of the product, reading data from the wireless tag, and, if the correct information on the manufacturer or the distributor of the product is recognized, determining the product to be the genuine product. A technology is also known that further improves the security for preventing counterfeiting by encryption processing the data stored in the wireless tag (for an example, refer to Japanese Unexamined Patent Application No. 2005-216316).

However, the authentication technology described in Japanese Unexamined Patent Application No. 2005-216316 or other technology that embeds an IC chip or marker to perform the authentication requires an information storage medium to be embedded or attached to the main body, packing materials, or the like, of the products beforehand during the manufacturing stage or packaging stage. Accordingly, these methods and technologies allow for authentication of only those products with such tags or markers attached and do not solve the problem of the need to authenticate large amounts of already existing products to which such tags or markers are attached. Furthermore, only people with special equipment which is capable of reading and confirming the information attached to products can perform the authentication of the products. Even further, each manufacture or distributor needs to attach a tag, marker, or the like to all the products to evaluate the products, thereby increasing manufacturing processes and man-hours.

In addition, technology that utilizes an information storage medium can only determine authenticity of products, but can not automatically evaluate the value of products, which may vary depending on changes in conditions of the products as seen in second hand goods, and other characteristics.

SUMMARY

In consideration of the problems mentioned above, the present invention has an objective of providing a product evaluation system and a product evaluation method that allows people without special expertise or experience to perform authentication and value estimation with a very small number of mistakes; or to accurately perform authentication and value estimation of large amounts of products with minimal human resources. Another objective of the present invention is to provide a product evaluation system and a product evaluation method that evaluates the authenticity of products as is without the need for the manufacturer or the distributor to attach information, such as a marker or tagger, to a product beforehand in the manufacturing stage. Furthermore, another objective of the present invention is to provide a product evaluation system and a product evaluation method that can automatically estimate the value of a product according to the condition and other characteristics of the product.

According to various embodiments of the present invention, characteristic information of a product targeted for evaluation is acquired by way of a characteristic acquisition mechanism that acquires characteristics of the product, and specific evaluation of the product is performed based on a comparison of the acquired characteristic information with information related to the product previously stored in a data store. Therefore, the product is evaluated "as is" by using the characteristics of the product acquired by the characteristic acquisition mechanism, without the need to embed an information storage medium such as an IC chip or marker onto the main body of the product or the packing material in advance during the manufacturing stage of the product.

In addition, because information related to the product targeted for evaluation is stored in a data store beforehand and the product is automatically evaluated by a system based on comparison of the information related to the product with the characteristic information of the product targeted for evaluation, an accurate evaluation with a very small number of mistakes can be performed and the result of the evaluation is not dependent on the special expertise or experience of the people who perform the evaluation itself. Furthermore, such an automated system allows for a larger quantity of products to be evaluated within a specific period of time in comparison to evaluation performed by humans.

In addition, according to various embodiments of the present invention, authentication of a product can be performed by storing the characteristic information of genuine products and the characteristic information of counterfeit products in the data store in advance and comparing the characteristic information of the product targeted for evaluation with these two kinds of characteristic information stored in the data store. This automated authentication system allows for accurate and rapid authentication.

In addition, according to various embodiments of the present invention, a value estimation of a product can be performed by storing the value information and the market information of products in the data store in advance and referencing the value information and the market information corresponding to the characteristic information of the product targeted for evaluation acquired by the characteristic acquisition mechanism. This automated value estimation system allows for accurate and rapid value estimations.

Additionally, according to various embodiments of the present invention, accurate and rapid authentication and value estimations can be simultaneously achieved. Furthermore, the resale price of products in varying conditions, such as in the case of second hand products, can be estimated based on information regarding the market value of products in varying conditions.

Additionally, because the product evaluation system according to various embodiments of the present invention comprises a characteristic acquisition mechanism which acquires the characteristic information of the product targeted for evaluation and a product identification mechanism which identifies the type of the product targeted for evaluation based on the characteristic information acquired by the characteristic acquisition mechanism, identification of products is automated by a system and input operations by an operator of the system are reduced. Because of this, evaluations can be efficiently performed, and continuous evaluations of large amounts of products are possible.

Furthermore, according to various embodiments of the present invention, by acquiring characteristics of products by using appropriate devices for different type of products for the purpose of characteristic acquisition, it is possible to analyze differences in internal construction of products, materials, pigments of patterns, metal parts, sewn fabrics, adhesive agents, formed patterns such as coatings, compositions of precious metals, accuracy of patterns, surface roughness and the like. Evaluations can also be performed with even more accuracy when multiple devices are used in combination.

Furthermore, according to various embodiments of the present invention, by updating information related to products following each evaluation, additional information which may be utilized for evaluation is continuously accumulated as well as updated to the most recent information thereby continuously improving the accuracy of the evaluation of the products.

Furthermore, the product evaluation system according to various embodiments of the present invention can be utilized for the evaluation of large volumes of products, such as custom inspection systems, logistics and physical distribution management systems, product management systems, and the like, by designing the system for continuous evaluation of multiple products.

Various embodiments of the present invention can also be defined as a product evaluation method using each of the components of the product evaluation system described up to this point. According to this type of product evaluation method, benefits similar to those obtained in the product evaluation system mentioned above can be obtained.

According to the product evaluation system and the product evaluation method according to various embodiments of the present invention, authentication and value estimations of large amount of products can be rapidly and accurately performed. Furthermore, evaluations can be performed "as is" even with products which do not have an embedded information recording medium, such as an evaluation tag or marker.

BRIEF DESCRIPTION OF THE DRAWINGS

FIG. 4 is a data structure diagram showing an example of the composition of a product catalog database (DB);

FIG. 5 is a data structure diagram showing an example of the composition of a characteristic acquisition mechanism DB;

FIG. 6 is a data structure diagram showing an example of the composition of a genuine product characteristic DB;

FIG. 7 is a data structure diagram showing an example of the composition of a counterfeit product characteristic DB;

FIG. 8 is a data structure diagram showing an example of the composition of a product market value DB;

DETAILED DESCRIPTION OF THE PREFERRED EMBODIMENTS

The present invention is a product evaluation system and a product evaluation method that acquires information related to characteristic information of the product targeted for evaluation, compares the acquired information to information related to the characteristics of genuine products or information related to the characteristics of counterfeit products generated beforehand, and then evaluates whether the product targeted for evaluation is a genuine product or a counterfeit product as well as acquires the condition of the product targeted for evaluation and estimates the value of that product.

In the following, an embodiment of the present invention will be described referring to the attached drawings. The system configuration, the database composition, and the process flow described below do not limit the present invention and can be modified in many different ways within the scope of the intent of the present invention.

Figure 1:
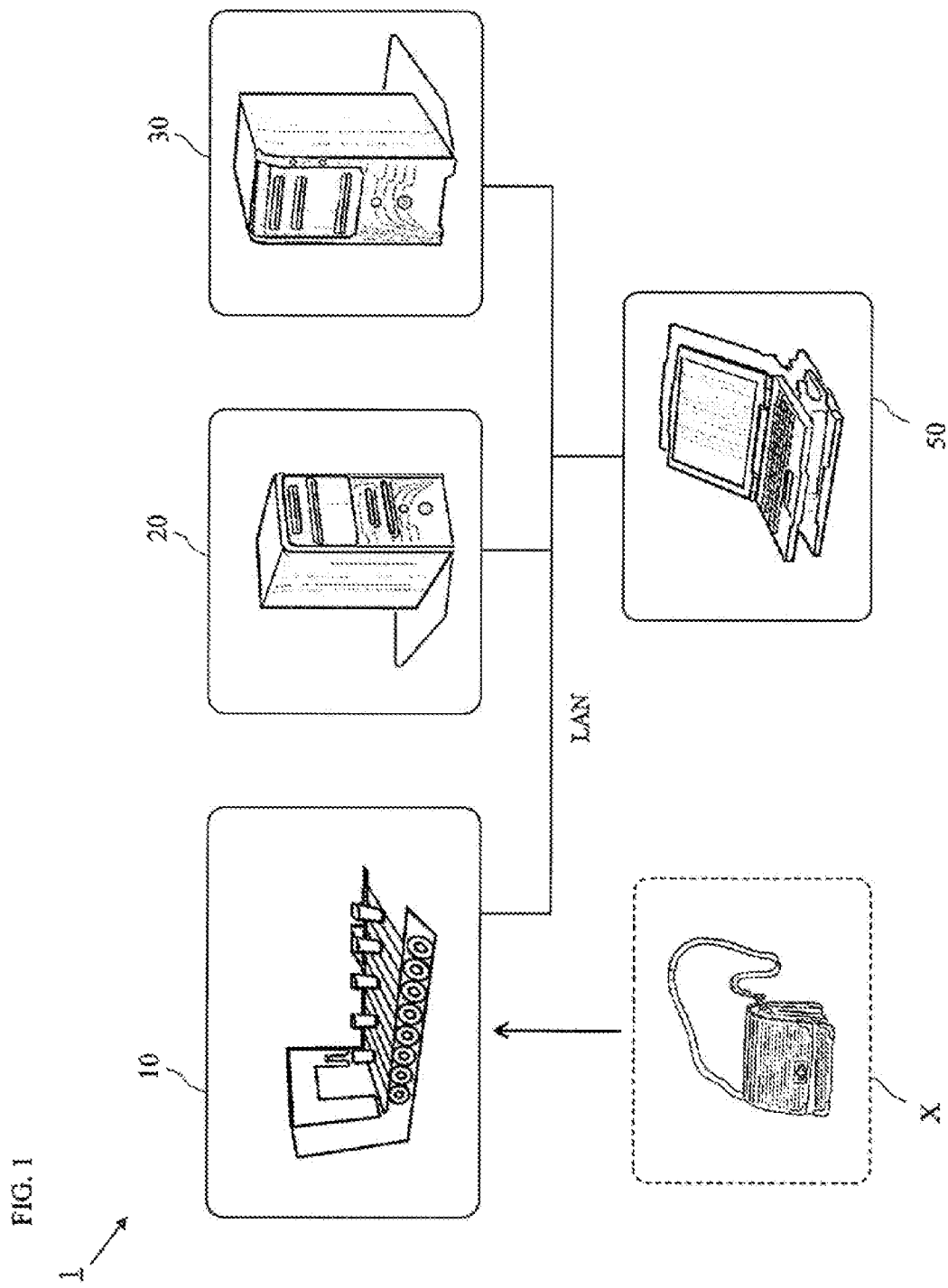
FIG. 1 is a schematic block view of the product evaluation system related to the first embodiment of the present invention.
Figure 2:
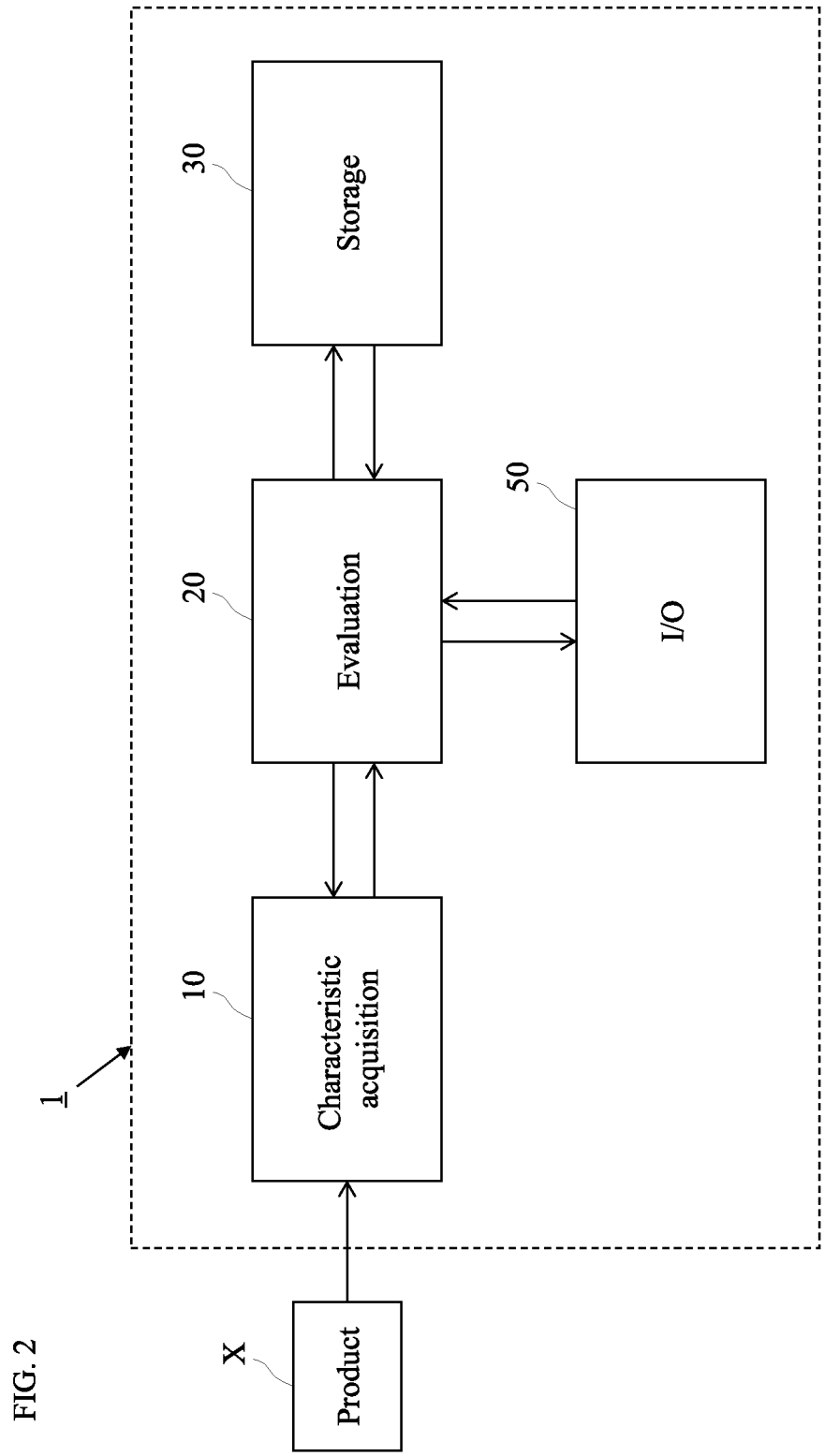
FIG. 2 is a block diagram showing a schematic composition of the product evaluation system.
Figure 3:
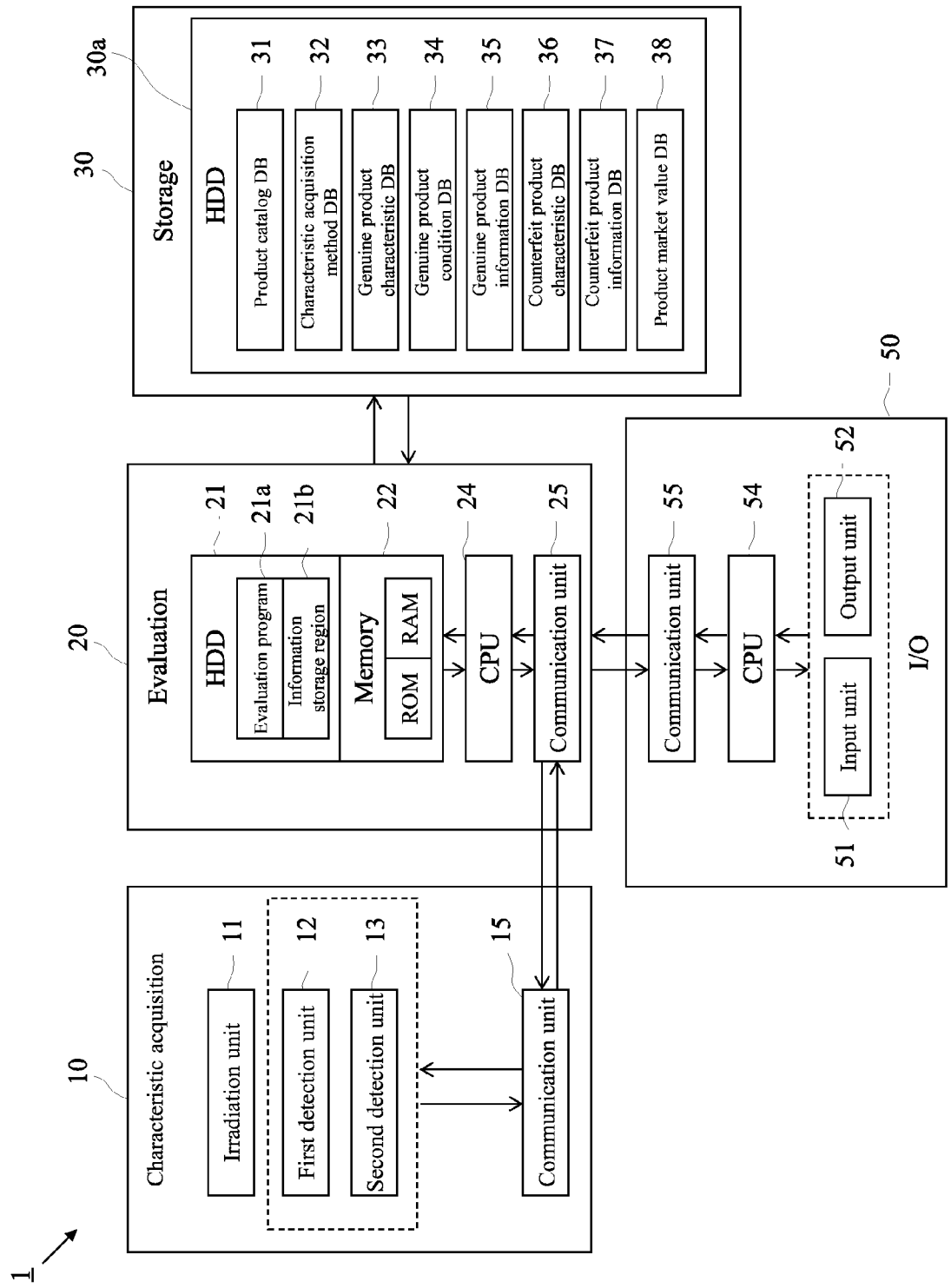
FIG. 3 is a block diagram showing a schematic composition of the product evaluation system.
Figure 9:
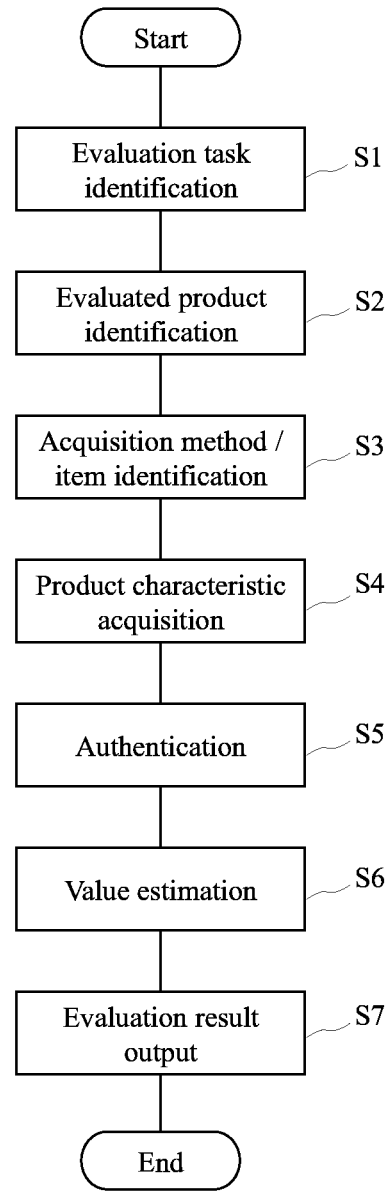
FIG. 9 is a flowchart of an evaluation process.

FIG. 1 to FIG. 9 are related to the first embodiment of the present invention. FIG. 1 is a schematic block view of the product evaluation system; FIG. 2 and FIG. 3 are block diagrams showing a schematic composition of the product evaluation system; FIG. 4 shows an example of the composition of a product catalog DB (database); FIG. 5 shows an example of the composition of a characteristic acquisition mechanism DB; FIG. 6 shows an example of the composition of a genuine product characteristic DB; FIG. 7 shows an example of the composition of a counterfeit product characteristic DB; FIG. 8 shows an example of the composition of a product market value DB; and FIG. 9 shows a flowchart of an evaluation process.

The entire configuration of the product evaluation system 1 in the first embodiment will be described referring to FIG. 1 and FIG. 2.

As shown in FIG. 1 and FIG. 2, the product evaluation system 1 related to the first embodiment is comprised by a characteristic acquisition mechanism 10 that acquires information related to the characteristics of product X, an evaluation mechanism 20 that performs evaluations which include authentication of products and value estimations based on information related to the characteristics acquired by way of the characteristic acquisition mechanism 10, a data store 30 that stores each database to be compared in order for the evaluation mechanism 20 to perform evaluations, and an input/output (I/O) component 50 that inputs information required by the evaluation mechanism 20 to perform evaluations and outputs the results of the evaluations performed by the evaluation mechanism 20.

As an example of a configuration that can be used for the product evaluation system 1, a test/analysis device such as radiographic test equipment can be used as the characteristic acquisition mechanism 10, an application server that stores application programs which perform evaluation processing can be used as the evaluation mechanism 20, a database server that stores databases required by the evaluation process can be used as the data store 30, and a terminal device such as a personal computer can be used as the I/O component 50. These devices can be connected through a network such as a LAN or the Internet. The characteristic acquisition mechanism 10, the evaluation mechanism 20, the data store 30, and the I/O component 50 can be comprised as physically different devices or comprised by a single device that integrates all of them.

Additionally, the characteristic acquisition mechanism 10 and the I/O component 50 can be different devices or, for example, can be comprised by a single terminal device such as a portable terminal having a display or a handheld terminal, equipped with a sensor or a scanner. The characteristic acquisition mechanism 10 can be one device such as a handheld terminal equipped with a sensor, or, for example, it can be comprised by a device wherein a product is placed on a transport assembly of a product transport device such as a belt conveyor in which this transport device is provided with an enclosed area where the product passes through internally and wherein the characteristic acquisition mechanism 10 is installed inside this area. Similarly, the evaluation mechanism 20 and the data store 30 may be comprised by different devices, or the evaluation mechanism 20 and the data store 30 may also be combined into a single server, or the like.

Additionally, all devices can be installed at the same place and connected by a LAN, or each device can be installed at separate locations. When the devices are installed at separate locations, the connection can be made through a wide area communication network such that several devices, for example, the characteristic acquisition mechanism 10 of a test/analysis device and the I/O component 50 of a terminal may be installed at a location where evaluations of products are performed and used to input product information and output evaluation results, and the evaluation mechanism 20 of an application server and the data store 30 of a database server may be installed at a separate location (such as an information processing center) where evaluation processing is performed.

As an example where all the devices are installed at one location, a utilization method may be used where large amounts of products are continuously evaluated such as a logistics or a physical distribution center or a customs facility. As an example where functions for product information input and evaluation result output and functions for evaluation processing are provided at separate locations such as remote locations, a utilization method can be used where an appraiser of products performs evaluations of products one at a time. When provided at a remote location, the appraiser or the operator can only input information and verify results while access to the evaluation processing programs and evaluation database can only be performed by the service provider of the system. Hence, security can be ensured.

The products X can be any type of item as long as they are objects whose characteristic information (described later) can be acquired. They can be bags, shoes, small items, apparel, jewelry, loose stones (naked stones), art work, or clocks/watches whose raw material is leather, fur, fabric (cloth), metal, precious metal, resin, rubber, glass, wood, stone material, or the like, or they can be precision machinery, household electronics, automobiles, motorcycles, perfumes, etc.

The characteristic acquisition mechanism 10 is a device for measuring the characteristics of products and is comprised by a radiographic test device, fluorescent X-ray analysis device, ultraviolet absorption analysis device, image enlargement processing device, surface roughness measurement device, infrared light absorption/penetration analysis device, acoustic frequency analysis device, odor sensor, or reflection coefficient measurement device or any combination thereof. When these devices are used in combination, a single, multifunction device may be used, or the results obtained by performing various analyses using many different devices may be used. The characteristic acquisition mechanism 10 can be formed by various different combinations or compositions according to the type of product to be evaluated or depending on the type of information related to the characteristics of the product to be obtained (hereinafter referred to as characteristic information).

As shown in FIG. 1, the product evaluation system 1 of the first embodiment is an example of an installation that combines each device for each purpose at one location, such as a physical distribution center or a customs facility, and each device is connected by a LAN. The characteristic acquisition mechanism 10 of this embodiment is a device that performs penetration tests and fluorescent X-ray analysis using X-rays, and is mounted to the inside of a transport assembly of a product transport device equipped with a belt conveyor, and is comprised so as to allow continuous evaluations of multiple products. In this way, a composition provided with the characteristic acquisition mechanism 10 mounted inside a belt conveyor makes it possible to continuously evaluate large volumes of products.

As shown in FIG. 3, the characteristic acquisition mechanism 10 of this embodiment is comprised by an irradiation unit 11 that irradiates X-rays onto the product X to be evaluated, a first detection unit 12 that detects the penetrated penetration X-rays, a second detection unit 13 that detects fluorescent X-rays, and a communication unit 15 that sends the detected information to the evaluation mechanism 20.

The generation of a transparent image using the X-ray transmission method of the characteristic acquisition mechanism 10 uses known technology and irradiates X-rays onto the product X to be evaluated using the irradiation unit 11, uses the physical material detected by the first detection unit 12 to form the difference in X-ray absorption into images, and then generates transparent image data of the inside of the product X as characteristic information. This internal transparent imaging makes it possible to confirm and identify the internal construction, the shape of the components, the existence of IC tags, and internal imprints of the product X.

Additionally, the fluorescent X-ray analysis method of the characteristic acquisition mechanism 10 also uses known technology and uses the second detection unit 13 to detect the fluorescent X-rays, which have a particular wavelength, and were obtained by irradiating X-rays to generate wavelength and intensity information as characteristic information. The types of elements contained in the product can be specified by measuring the energy of these fluorescent X-rays (qualitative analysis) and the density of elements can be evaluated from the intensity of the fluorescent X-rays of each element (quantitative analysis).

In this manner, characteristic information obtained by an X-ray penetration test (image data) and characteristic information obtained from an analysis of the fluorescent X-rays (wavelength and intensity information) is sent to the evaluation mechanism 20 through the communication unit 15. The characteristic information of the product X acquired by the characteristic acquisition mechanism 10 is used by hereafter described evaluation mechanism 20 to perform the authentication and value estimation of the product X.

The type of characteristic information that shows the characteristics of the product X acquired by the characteristic acquisition mechanism 10 differs depending on the device that comprises the characteristic acquisition mechanism 10. In other words, the characteristic information is information the device that comprises the characteristic acquisition mechanism 10 can detect and acquire. Each type of detected information that is compatible with the test method and analysis method used by the device (hereinafter referred to as characteristic acquisition method) is acquired as characteristic information of the product X. Specifically, in addition to the internal transparent image data obtained by the X-ray penetration test mentioned above and the wavelength and intensity obtained by the fluorescent X-ray analysis mentioned above, the following types of characteristic information can be obtained according to the characteristic acquisition method.

When performing ultraviolet light absorption analysis as the characteristic acquisition method, the wavelength and intensity of the ultraviolet light are detected as the characteristic information and then the material, pattern pigment, and other components of product X are identified based on difference in the ultraviolet light absorptance.

During an image enlargement process that uses visible light, pattern, printing and imprints, textured pattern material, and sewing conditions of product X are identified by generating an enlarged image of the product X, extracting characteristic amounts, and then performing pattern matching.

During surface roughness measurements using visible light, the surface roughness value is acquired as the characteristic information, unevenness of the surface of the product X is quantified, and surface shapes of the material or embossing of artificial leather are identified and blemishes or flaws on the surface are identified.

During infrared light absorption analysis, the infrared light absorption rate with a wide range from near infrared to far infrared is measured and acquired as the characteristic information and differences in the composition of material, pattern pigment, coating material, and the like of the product X are distinguished and identified.

During infrared penetration analysis, the wavelength of the penetrating infrared light is acquired as the characteristic information and materials such as sapphire glass and clear coating are distinguished.

During acoustic frequency analysis, the acoustic properties of, for example, the frequencies of acoustic signals from the audible region to the ultrasonic region (10 Hz to 2 MHz) are acquired and analyzed as the characteristic information. When the sounds are audible, voice print matching analysis is performed and sounds from the movement of a watch are compared and identified. In addition, elastic waves in the ultrasonic frequency range are analyzed and characteristics of the machinery as well as conditions such as abrasion and damage are evaluated.

During odor qualitative analysis using an odor sensor, the type and strength of the odor are detected as the characteristic information and the material of the product X such as leather or the aroma of the perfume are distinguished and identified.

During reflection coefficient measurement, the reflection coefficient when striking the surface of the product X is acquired as the characteristic information, and the material of the product is identified.

The type of the characteristic information acquired by any of these characteristic acquisition methods to be used for an evaluation can be determined depending on the type of product to be evaluated.

Although the characteristic acquisition mechanism 10 of this embodiment is comprised by the irradiation unit 11, the first detection unit 12, the second detection unit 13, and the communication unit 15, the configuration can be modified depending on the characteristic acquisition method according to the type of product to be evaluated. For example, in ultraviolet absorption analysis, image enlargement processing, surface roughness measurement, infrared light absorption analysis, infrared light penetration analysis, or reflection coefficient measurement, the composition can include the irradiation unit 11 that functions to irradiate or generate each light wave used for the tests, the first detection unit 12 that detects measured values obtained by the irradiated or generated light, and the communication unit 15 that sends the detected information to the evaluation mechanism 20. Furthermore, in acoustic frequency analysis and odor analysis using an odor sensor, it is not necessary to provide the irradiation unit 11 and the composition can include the first detection unit 12 and the communication unit 15.

Next, the evaluation mechanism 20 of this embodiment will be described. The evaluation mechanism 20 of this embodiment uses, for example, an application server and, as shown in FIG. 3, is equipped with an evaluation program 21a that performs authentication and value estimation processing for the product X, a hard disk drive (HDD) 21 that stores the evaluation program 21a, a memory 22 that contains a read-only memory (ROM) and a random access memory (RAM) for temporarily storing data and programs required while executing the evaluation program 21a, a central processing unit (CPU) 24 that controls and calculates each process of the evaluation mechanism 20, and a communication unit 25 that provides communication between the evaluation mechanism 20 and the characteristic acquisition mechanism 10, the data store 30, and the I/O component 50. Additionally, the HDD 21 has an information storage region 21b for storing various information required for executing the evaluation program 21a.

In the evaluation mechanism 20, the CPU 24 reads the evaluation program 21a from the HDD 21 and executes evaluation processing. When the evaluation program 21a is executed, the CPU 24 executes each type of fundamental program for hardware control, such as I/O control stored in the ROM of the memory 22. In addition to this, the CPU 24 performs arithmetic processing while data and programs required to execute the evaluation program 21a are temporarily stored in the RAM of the memory 22. The data required to execute the evaluation program 21a includes characteristic information of the product X acquired by the characteristic acquisition mechanism 10 and information within each database stored in the data store 30. The evaluation mechanism 20 acquires these information from the characteristic acquisition mechanism 10 and the data store 30 as necessary and then stores the information in the RAM of the memory 22 and performs arithmetic processing.

Next, the data store 30 of this embodiment will be described. The data store 30 of this embodiment uses, for example, a database server and, as shown in FIG. 3, is comprised by a HDD 30a that stores each database and each database 31 to 38 stored in the HDD 30a. In this embodiment, the processing of reading and writing of each database 31 to 38 is controlled by the CPU 24 of the evaluation mechanism 20.

Databases such as a product catalog DB 31, a characteristic acquisition method DB 32, a genuine product characteristic DB 33, a genuine product condition DB 34, a genuine product information DB 35, a counterfeit product characteristic DB 36, a counterfeit product information DB 37, and a product market value DB 38 are stored in the HDD 30a. These databases consist of information created in advance by collecting required information which is then stored in the HDD 30a, and are referenced when the evaluation mechanism 20 performs the authentication and value estimation of the product X. In addition to the information created in advance, new information detected in the evaluation process may be added or updated in each database as necessary.

Note, these types of databases and the configuration and items of each database described below are not limited to this embodiment and can be modified to different configurations within the scope of the intention of the present invention. All databases may be used in the evaluation process, or only a part of the databases can be used as well. The following is an example of a configuration of each database.

Information related to the product targeted for evaluation in the product evaluation system 1 of the present invention is registered in the product catalog DB 31. Specifically, as shown in FIG. 4, "product categories" which represent the type of product such as bags, watches, precious metals, and jewels; as well as "brand names", "product groups", "product names", "product numbers", "colors", "sizes ", and" shapes" of these products are stored. "Evaluation tasks" used to perform evaluation processing for these products and "identification IDs" for identifying the products are also stored. The details of evaluation task will be described later, but the evaluation task has registered information to distinguish whether authentication or value estimations will be performed. Because products registered in the product catalog DB 31 beforehand are targeted for evaluation in the product evaluation system 1 of an embodiment of the present invention, the registration process should be performed before evaluating new products. Data registered in the product catalog DB 31 is data with various patterns corresponding to the attributes of the product such as individual products, product groups, or product categories.

As shown in FIG. 5, the "characteristic acquisition method" for acquiring characteristic information of products used in the evaluation process and the "characteristic items" which indicate the type of characteristic information obtained by the characteristic acquisition method are registered for each product in the characteristic acquisition method DB 32. The number of the characteristic item is not limited to one per product per characteristic acquisition method. Multiple characteristic items can be registered per product per characteristic acquisition method. For example, as shown in FIG. 5, because a plurality of characteristic information such as the composition of materials, the composition of the pigments used on patterns, the composition of fittings, or the composition of coating material can be acquired in fluorescent X-ray analysis as a characteristic acquisition method for identification ID 0001 of bag a1, multiple characteristic items corresponding to fluorescent X-ray analysis are registered in advance.

Characteristic information such as measured values and image data of each characteristic item for a genuine product (hereinafter referred to as a "genuine value") is registered in the genuine product characteristic DB 33. For example, as shown in FIG. 6, a "characteristic item" and a "genuine value" are contained in the genuine product characteristic DB 33. Products and characteristic items registered in the genuine product characteristic DB 33 correspond to the products and characteristic items registered in the characteristic acquisition method DB 32. The evaluation mechanism 20 performs an evaluation to determine whether or not a product is a genuine product by comparing a genuine value that indicates a value as a genuine product in the genuine product characteristic DB 33 to the characteristic information of the product X targeted for evaluation acquired by the characteristic acquisition mechanism 10.

The conditions of genuine products and ranking according to condition are registered in the genuine product condition DB 34. For example, when the condition of the bag a1 is evaluated by the number of scratches, information stating 1 scratch is rank A, 3 scratches is rank B, and 5 scratches or more are rank C is registered. As an example, since the number of scratches can be acquired using the characteristic acquisition mechanism 10, ranking which corresponds to the conditions of the genuine product can be automatically performed by the product evaluation system 1.

Information used to manage genuine products which cannot be acquired by the characteristic acquisition mechanism 10, such as whether or not a unique marker such as an IC chip is mounted on the product, is stored in the genuine product information DB 35. This information is offered in advance from the manufacturer or the distributor. This information makes it possible to immediately determine a counterfeit product when this information in the genuine product information DB 35 and the information of the product targeted for evaluation are different. This kind of unique information regarding a product is also one piece of characteristic information which may be used to evaluate products. Note, this information can also be stored in the product catalog DB 31 without separately providing this database as an independent database.

Characteristic information such as measured values and image data of each characteristic item for a counterfeit product (hereinafter referred to as a "counterfeit value") is registered in the counterfeit product characteristic DB 36. For example, as shown in FIG. 7, a "characteristic item" and a "counterfeit value" are contained in counterfeit product characteristic DB 36. When a counterfeit product is detected, the information of that counterfeit product is added and registered in the counterfeit product characteristic DB 36 and consequently, the information in the counterfeit product characteristic DB 36 is accumulated. Products and characteristic items registered in the counterfeit product characteristic DB 36 correspond to any of the characteristic items of each product and characteristic acquisition method registered in the characteristic acquisition method DB 32. The information in the counterfeit product characteristic DB 36 is that of counterfeit products that have been detected to-date. The evaluation mechanism 20 performs an evaluation to determine whether or not a product is a counterfeit product by comparing a counterfeit value that indicates a value as a counterfeit product in the counterfeit product characteristic DB 36 to the characteristic information of the product X targeted for evaluation acquired by the characteristic acquisition mechanism 10.

In the authentication process, since it is possible to evaluate whether or not a product is a genuine product by referencing the genuine product characteristic DB 33 and the genuine product information DB 35 and by comparing a genuine value in the characteristic item of a product targeted for evaluation to the characteristic information of the product X acquired by the characteristic acquisition mechanism 10, genuine values for each characteristic item related to the product targeted for evaluation must be registered in the genuine product characteristic DB 33 and the genuine product information DB 35.

On the other hand, information obtained from counterfeit products is registered, which can be obtained only when counterfeit products are obtained, in the counterfeit product characteristic DB 36, and information for all products and characteristic items are not registered in the database. However, a higher accuracy in evaluations of authenticity can be achieved by registering information of circulating counterfeit products in the counterfeit product characteristic DB 36 and then using both counterfeit product characteristic DB 36 and genuine product characteristic DB 33 in the authentication process. Besides, since counterfeit products in high circulation can be immediately evaluated by confirming the counterfeit product characteristic DB 36 prior to confirming the genuine product characteristic DB 33 and the genuine product information DB 35, the authentication can be efficiently performed by determining the sequence of the databases to be confirmed depending on the products.

Information regarding circulating counterfeit products provided by brand owners, police, customs, external sources, and the like is registered in the counterfeit product information DB 37. For example, when identifying information such as an SKU (Stock Keeping Unit) of a product (for which counterfeit products exist) is registered, the evaluation criteria can be stricter by increasing the number of the inspected items as compared to those in a usual case in the authentication of that product.

Market values of used genuine products and works of art are registered in the product market value DB 38. Specifically, as shown in FIG. 8, "ranks" according to the conditions of the products and "market prices" for each rank are registered. To estimate the value of a product, first, the characteristic acquisition mechanism 10 acquires the condition of the product X, the genuine product condition DB 34 is referenced and the rank of the product X corresponding to the condition is acquired. Then, the product market value DB 38 is searched based on this acquired condition to acquire a market price. Data registered as a market price can be a sales price, or can be a discount amount or discount rate to reduce the market price according to the condition of the product. In the case of the latter, the market price for each product is registered in another database and the sales price can be obtained by subtracting discount amount from the market price or multiplying discount rate by the market price.

A certain amount of information is acquired, collected, and registered in advance in each of these databases, which the product evaluation system 1 uses for authentication and value estimations. For example, in the genuine product characteristic DB 33 that stores information related to the characteristics of products, and in the counterfeit product characteristic DB 36, if any counterfeit product is obtained, genuine values, which represent the characteristics of genuine products, and counterfeit values, which represent the characteristics of counterfeit products, are registered respectively, by acquiring and analyzing characteristic information of each product for each characteristic acquisition method using the characteristic acquisition mechanism 10. Furthermore, the characteristic information acquired by the characteristic acquisition mechanism 10 during the evaluation processing is added or updated to these databases. This makes it possible to improve the accuracy of information used in the evaluations.

Next, the I/O component 50 of this embodiment will be described. The I/O component 50 of this embodiment uses a personal computer and, as shown in FIG. 3, is comprised by an input unit 51 from which the operator inputs information when performing evaluation processing, an output unit 52 that outputs evaluation results, a communication unit 55 for sending and receiving input information and output information to and from the evaluation mechanism 20, and a CPU 54 that controls the input unit 51, the output unit 52, and the communication unit 55. A keyboard, mouse or the like can be used as the input unit 51 and a display, printer or the like can be used as the output unit 52.

In this embodiment the operator can input the product targeted for evaluation. In this case, the I/O component 50 is provided with a combination of functions as a product identification mechanism. The product targeted for evaluation is identified by selecting it from a list of products displayed in a display functioning as the output unit 52 using a keyboard or a mouse functioning as the input unit 51. A detailed description of the operation will be described later, but when input is not required, such as when the product targeted for evaluation is fixed, the evaluation mechanism 20 acquires the information stored in the information storage region 21b and makes a decision. In this case, the evaluation mechanism 20 functions as the product identification mechanism.

Next the operation of the product evaluation system 1 of the first embodiment will be described. In the product evaluation system 1 of this embodiment, either authentication or a value estimation, or both authentication and a value estimation can be performed as a type of evaluation (hereafter referred to as an "evaluation task"). Authentication evaluates whether a product is a genuine product or a counterfeit product. A value estimation evaluates the condition of a product and then estimates the value of the product base on the market price. This evaluation task can be set in accordance with the purpose of use of the product evaluation system 1. As examples of various settings for the evaluation task, the task evaluation is designated by an operator who operates the system, such as an appraiser, designates when the evaluation is performed, automatically set within the system, or fixed beforehand. Additionally, when an operator designates an evaluation task, a mode switch function can be provided that makes it possible to establish settings such that evaluation tasks identical to previously designated evaluation tasks will execute continuously until a mode switch is designated.

In more detail, when the products to be evaluated are different for each evaluation, the settings can be made such that the operator can designate an evaluation task for each evaluation or designate an evaluation task when switching modes. In addition, when the product evaluation system 1 is linked to an external system (for example, a product management system or a physical distribution system) and evaluation tasks are to be automatically determined based on information input from the linked external system, an operator does not need to designate the evaluation task.

It is also possible to make the settings such that the designation of evaluation tasks is completely unnecessary when specific evaluation tasks are decided upon, such as for a value estimation system of diamonds or an authentication system for specific brand names. Necessities of task designation and evaluation tasks to be executed described above according to the purpose of use or the configuration of the product evaluation system 1 can be determined by making these settings and storing the setting information in the information storage region 21b inside HDD 21 of the evaluation mechanism 20. This may be carried during initialization of the system when first installing the system or switching over from another system. Additionally, this information can be updated when the operator switches modes or when information is input from an external system.

FIG. 9 shows a process flow of an evaluation process of the product evaluation system 1 of this embodiment. This process is executed by the evaluation mechanism 20.

In the evaluation process of this embodiment, an evaluation task identification step S1, an evaluated product identification step S2, an acquisition method/item identification step S3, a product characteristic acquisition step S4, authentication step S5, a value estimation step S6, and an evaluation result output step S7 may execute sequentially. The sequence of each step of the evaluation process is not limited to this sequence and as described later, the execution sequence of the evaluation task identification step S1 and the evaluated product identification step S2 or the execution sequence of the authentication step S5 and the value estimation step S6 can be changed. In addition, in some cases only one of the authentication step S5 and the value estimation step S6 executes. A step that includes the authentication step S5 and the value estimation step S6 shall be referred to as the product evaluation step.

In the evaluation task identification step S1, when the system is started by a system start operation, etc. performed by the operator, first, the information stored in the information storage region 21b inside the HDD 21 that determines whether or not to designate an evaluation task is referenced, and whether or not the operator must designate an evaluation task is determined. When an evaluation task must be designated, an evaluation task selection screen (not shown in the figure) displays in the display that functions as the output unit 52. The operator selects and inputs either authentication or a value estimation or both evaluation tasks from a keyboard or a mouse that functions as the input unit 51. Thereafter, the selected evaluation task is written to the information storage region 21b inside the HDD 21.

In contrast, when it is not necessary to designate an evaluation task, the previously designated evaluation task or the evaluation task fixed by the system is acquired from the information storage region 21b to identify the evaluation task.

Next, the type of the product targeted for evaluation is designated in the evaluated product identification step S2. In the same manner as designating an evaluation task, settings for designating a product can be made by designations from an operator who operates the system, automatic settings in the system, or using settings regarding a fixed product designated in advance. When an operator designates the type of the product, a mode switch function can be provided that makes it possible to establish settings such that an evaluation for the type of the product identical to previously designated type of the product execute continuously until a mode switch is designated.

In other words, when the products to be evaluated are different for each evaluation, the setting can be made such that the operator can designate a product for each evaluation or designate a product when switching modes. In addition, when the product evaluation system 1 is linked to an external system (for example, a product management system or a physical distribution system) and products to be evaluated are to be automatically determined based on information input from the linked external system, an operator does not need to designate the product.

It is also possible to make the settings such that the designation of products is completely unnecessary when specific products are decided upon such as for a value estimation system of diamonds or an authentication system for specific brand names. Necessities of product designation and products targeted for evaluation can be determined by making there settings and storing the setting information in the storage region 21b inside HDD 21 of the evaluation mechanism 20. This may be carried during initialization of the system when first installing the system or switching over from another system. Additionally, this information can be updated when the operator switches modes or when information is input from an external system.

The evaluated product identification step S2 references the information that determines whether or not a product needs to be designated, which is stored in the information storage region 21b inside the HDD 21 and then determines whether or not the product targeted for evaluation must be designated by the operator. When the product needs to be designated, the operator inputs the product category, brand name, product group, and product name. Thereafter, the product, product group, or product category input by the operator are written to the information storage region 21b inside the HDD 21. Whether to designate a product, designate a product group, or designate a product category can be determined according to the product targeted for evaluation.

In contrast, when it is not necessary to designate a product targeted for evaluation, the product designated last or the product fixed by the system is acquired from the information storage region 21b to identify the product targeted for evaluation.

In this embodiment, although the product to be evaluated in the evaluated product identification step S2 is identified after the evaluation task identification step S1 identifies the evaluation task, the sequence of the process is not limited to this. The evaluation task may be identified in an evaluation task identification step after the product is identified in a evaluated product identification step. The evaluation task and product identification may also take place simultaneously in a single process.

Next, in the acquisition method/item identification step S3, the characteristic acquisition method and the characteristic item corresponding to the product identified in the evaluated product identification step S2 are identified, which are the information required for the authentication or the value estimation of the product. If the product to be evaluated is the same as the product evaluated last time or when the product is fixed beforehand, there is no need to acquire the characteristic acquisition method and the characteristic item. As such, first, the information storage region 21b inside the HDD 21 is referenced to determine whether or not the characteristic acquisition method and the characteristic item must be acquired.

When acquisition of the characteristic acquisition method and the characteristic item are not required, the previously designated or fixed acquisition method and characteristic item are acquired from the information storage region 21b inside the HDD 21 to identify the characteristic acquisition method and the characteristic item. In contrast, when acquisition of the characteristic acquisition method and the characteristic item is required, an evaluation is performed to determine whether or not manual input was designated for the characteristic acquisition method and the characteristic item. In this embodiment, the operator can select manual input of the characteristic acquisition method and the characteristic item. When the operator wants to select the characteristic acquisition method and the characteristic item, manual input can be performable by selecting "manual input" on the characteristic acquisition method selection screen.

When manual input is selected, the operator inputs the characteristic acquisition method and the characteristic item. The characteristic acquisition method and the characteristic item to be input are not limited to a single method or a single item. Multiple characteristic acquisition methods and characteristic items can be input. In this way, the inspection items used for authentication or value estimations can be narrowed down by specifying characteristic acquisition methods and characteristic items, and thereby the evaluation process can be efficiently implemented.

In contrast, when manual input is not selected, the characteristic acquisition method DB 32 is referenced and the characteristic acquisition method and the characteristic item which correspond to the product X targeted for evaluation are acquired. In this way, the characteristic item to be used in the evaluation process is automatically determined. The characteristic acquisition method and the characteristic item which correspond to the product X are not limited to a single method or a single item. There are cases when multiple characteristic acquisition methods and characteristic items are registered in the characteristic acquisition method DB 32. In these cases, multiple characteristic acquisition methods and characteristic items which correspond to the product X are acquired.

Next, in the product characteristic acquisition step S4, the characteristics of the product are acquired based on the characteristic acquisition methods and characteristic items acquired in the acquisition method/item identification step S3. Hereafter, an example of the evaluation process will be described wherein the product X targeted for evaluation is a bag whose category is Bag, brand name is Brand A, product group is Group A1, product name is Bag a1, and identification ID is 0001. The characteristic acquisition method for evaluation of the product X is fluorescent X-ray analysis and the characteristic item is pigment composition.

First, when a request to send characteristic information is sent to the characteristic acquisition mechanism 10 based on the characteristic acquisition method and the characteristic item acquired in the acquisition method/item identification step S3, the characteristic acquisition mechanism 10 performs a fluorescent X-ray analysis to detect the pigment composition of the patterned area of the surface of the Bag a1, and sends the detection results to the evaluation mechanism 20.

Next, when the evaluation task is authentication, in the authentication step S5, the product X is evaluated to be either a genuine product or a counterfeit product based on the characteristic information of the product X acquired in the product characteristic acquisition step S4. The genuine product characteristic DB 33 is searched and characteristic information (genuine value) of the corresponding genuine product is acquired based on the characteristic acquisition method and the characteristic item of the characteristic information of the Bag a1 acquired by the characteristic acquisition mechanism 10.

For example, in the evaluation process of this embodiment, because fluorescent X-ray analysis is performed and a pigment composition is acquired in the product characteristic acquisition step of step S4, the genuine product characteristic DB 33 is searched and information corresponding to "fluorescent X-ray analysis" and "pigment composition" for identification ID 0001 is acquired. As shown in FIG. 6, the pigment composition of the genuine product Bag a1 consists of two components, component A and component B. This genuine value and the actual pigment composition acquired from Bag a1 are compared and if they are the same, the product is evaluated to be a "genuine product". If even one different component is detected, the product is evaluated to be a "counterfeit product".

This comparison of a pigment composition is one example, and other evaluation methods are also possible such as evaluating from the composition ratio of each component. Additionally, if a product is evaluated to be a "genuine product" and characteristic information is detected that does not exist in the genuine product characteristic DB 33 or when it is evaluated that a value should be statistically updated, adding to or updating of the genuine product characteristic DB 33 is performed using the characteristic information of the product X.

In the evaluation method described above, the genuine product characteristic DB 33 was referenced and the characteristics of the genuine product were used as an evaluation criterion to perform the evaluation. The counterfeit product characteristic DB 36 can also be referenced and the characteristic information of the counterfeit product (counterfeit value) can be used as an evaluation criterion. For example, if the pigment composition of a counterfeit Bag a1 is previously analyzed and a component that is not used in a genuine product can be clearly identified, the product can be evaluated to be a counterfeit product. As shown in FIG. 7, component C and component D that are not used in genuine products are registered as components of a pigment of a counterfeit Bag a1 in the counterfeit product characteristic DB 36. When component C or component D is detected from the evaluation target Bag a1, the product can be evaluated to be a "counterfeit product". Additionally, when a product is evaluated to be a counterfeit product and characteristic information is detected that does not exist in the counterfeit product characteristic DB 36, or when it is evaluated that a value that should be statistically updated, adding to or updating of the counterfeit product characteristic DB 36 is performed using the characteristic information of the product X.

Furthermore, authentication can also be performed using information other than the characteristic information registered in the genuine product characteristic DB 33 or the counterfeit product characteristic DB 36. For example, if the information that an IC chip is mounted to a genuine product of the product X is registered in the genuine product information DB 35, the product can be evaluated to be a genuine product when an IC chip mounted to the product X targeted for evaluation is detected by the characteristic acquisition mechanism 10.

Which databases to be referenced and what sequence of steps to be executed when an evaluation is performed using combinations of multiple characteristic items can be determined according to the product X targeted for evaluation or the credibility of the characteristic items. Additionally, when an evaluation is performed using combinations of multiple characteristic items, analysis methods such as discrimination analysis methods, multi-dimensional scaling analysis, or cluster analysis methods are applied and a reasonable authentication is performed.

Next, when the evaluation task is a value estimation, a value estimation of product X is performed in the value estimation step S6. This value estimation step S6 can be executed without regard to the evaluation result of the authentication step S5 described above. In other words, when the product X is a precious metal, etc. and the precious metal itself has value, a value evaluation in this value estimation step S6 can be performed even if the product was evaluated to be a counterfeit product in the authentication step S5.

When the evaluation task is a value estimation, information related to the condition of the product X such as size and number of blemishes are further acquired in the product characteristic acquisition step S4. Note that this information related to the condition of the product X is treated as characteristic information in the value estimation. Next, in the value estimation step S6, the genuine product condition DB 34 is referenced and a rank is acquired as value information of the product X targeted for evaluation corresponding to the acquired conditions such as the number of blemishes. Thereafter, based on the acquired rank, the product market value DB 38 is referenced and the market value is acquired as market information. If the acquired market value is the sales price, this value may be applied to the product X without any changes. If there are discount amounts or discount rates, the sales price of the product X is determined by calculated from the market value registered in a separate DB and the discount amounts or discount rates. Discount amounts and discount rates are also one type of market information.

Lastly, in the evaluation result output step S7, the evaluation result of "genuine product" or "counterfeit product" obtained in the authentication step S5 and the value of the product X as the evaluation result obtained in the value estimation step S6 are output to the display (output unit 52) of the I/O component 50. Note that the output unit 52 is not limited to a display and can be a printer. If a printer is used as the output unit 52, the result is output by printing.

The execution sequence of the authentication step S5 and the value estimation step S6 is not limited to the sequence described above. The value estimation can be performed first in the value estimation step and then the authentication can be performed in the authentication step, or the authentication and value estimation can be performed at the same time in one step. When only authentication is designated as the evaluation task, the value estimation step S6 does not execute. In contrast, when only a value estimation is designated as the evaluation task, the authentication step S5 does not execute.

Figure 10:
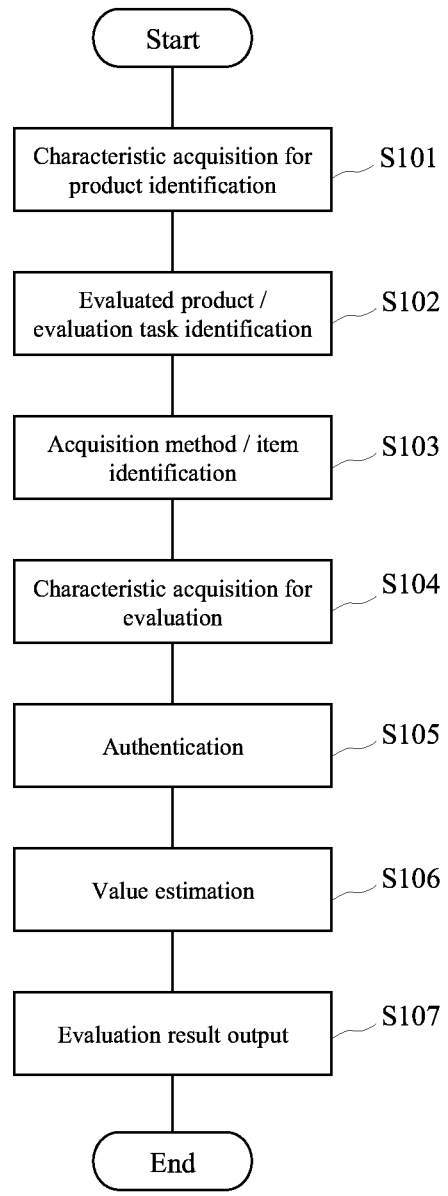
FIG. 10 is a flowchart of an evaluation process related to the second embodiment of the present invention.

Next, the second embodiment of the present invention will be described. The system configuration and the database configuration in the second embodiment are identical to the first embodiment and therefore description will be omitted. The operation of the product evaluation system 1 of the second embodiment will be described using FIG. 10. FIG. 10 is a flowchart of an evaluation process related to the second embodiment.

The product evaluation system 1 of this embodiment is provided with a function that automatically identifies the evaluation task and the type of product X targeted for evaluation from the characteristic information acquired by the characteristic acquisition mechanism 10. As shown in FIG. 10, in the evaluation process of this embodiment, a characteristic acquisition for product identification step S101, an evaluated product/evaluation task identification step S102, an acquisition method/item identification step S103, a characteristic acquisition for evaluation step S104, an authentication step S105, a value estimation step S106, and an evaluation result output step S107 sequentially execute. This evaluation process is executed by the evaluation mechanism 20. Note that the sequence of each step of the evaluation process is not limited to this sequence and, as described later, the characteristic acquisition for product identification step S101 and the evaluated product/evaluation task identification step S102 can be executed at the same time, and the execution sequence of the authentication step S105 and the value estimation step S106 can be changed. In addition, in some cases only one of the authentication step S105 and the value estimation step S106 executes. A step that includes the authentication step S105 and the value estimation step S106 shall be referred to as the product evaluation step.

In the characteristic acquisition step for product identification step S101, when the system is started by a system start operation performed by the operator, first, a request to send characteristic information is sent to the characteristic acquisition mechanism 10. This request to send is received by the characteristic acquisition mechanism 10, and characteristic information required in order to identify the product such as the size, shape, and material as well as the composition of the components of the product X is acquired and sent to the evaluation mechanism 20. The characteristic items required in order to identify products can be acquired by referencing the characteristic acquisition method DB 32. Note that the devices utilized for the characteristic acquisition mechanism 10 and the characteristic items which can be acquired using each of these devices are the same as described in the first embodiment.

Next, in the evaluated product/evaluation task identification step S102, the product targeted for evaluation and evaluation tasks are identified. Based on information such as the size, shape, and material as well as the composition of the components of the product X as acquired in the characteristic acquisition for product identification step S101, the product catalog DB 31 and genuine product characteristic DB 33 are referenced, a product whose characteristics match with the information of the product X is identified, and the identification ID of the product is acquired.

If products could not be identified for some reason, such as due to non-matching characteristic information, the operator manually inputs the product and evaluation task.

In this embodiment, the evaluation mechanism 20 has a function as a product identification mechanism when the product X is identified based on the characteristic information of the product X acquired by the characteristic acquisition mechanism 10. In contrast, I/O component 50 has a function as a product identification mechanism when the product targeted for evaluation is input by the operator.

While in this embodiment the evaluation task is acquired and identified from the product catalog DB 31, identification of the evaluation task is not limited to this method. Various types of settings identical to the first embodiment described above can also be used such as input by the operator, using the last evaluation task, automatically setting this up within the system, or executing a pre-set fixed evaluation task.

Next, when characteristic information other than the characteristic information acquired in the characteristic acquisition for product identification step S101 is required in order to perform authentication or a value estimation of the product X, the characteristic acquisition method and the characteristic item is identified in the acquisition method/item identification step S103 to acquire the necessary characteristic information. The acquisition method/item identification step S103 is identical to the acquisition method/item identification step S3 of the first embodiment described above and therefore description will be omitted.

Next, in the characteristic acquisition for evaluation step S104, any characteristic information that has not acquired in the characteristic acquisition methods and the characteristic items acquired in the acquisition method/item identification step S103, is acquired from the characteristic acquisition mechanism 10. The characteristic acquisition for evaluation step S104 is identical to the product characteristic acquisition step S4 of the first embodiment described above and therefore will be omitted.

Next, authentication is performed in the authentication step S105 based on the characteristic information of the product X acquired in the characteristic acquisition for product identification step S101 and the characteristic acquisition for evaluation step S104. Then, the value of the product X is evaluated in the value estimation step S106. Lastly, in the evaluation result output step S107, the evaluation result of "genuine product" or "counterfeit product" obtained in the authentication step S105 and the value of the product X as the evaluation result obtained in the value estimation step S106 are output to the display (output unit 52) of the I/O component 50.

The authentication step S105, value estimation step S106, and evaluation result output step S107 are identical to the authentication step S5, value estimation step S6, and evaluation result output step S7 of the first embodiment described above and therefore the description of these steps will be omitted.

In the second embodiment, the product is first identified in the evaluated product/evaluation task identification step S102 using the characteristic information acquired in the characteristic acquisition for product identification step S101 and then additional characteristic information is acquired in the characteristic acquisition for evaluation step S104, and evaluation is performed in the authentication step S105 and the value estimation step S106. However, it is also possible to acquire all the characteristic information required for the evaluation in the characteristic acquisition for product identification step S101 and then simultaneously perform the evaluated product/evaluation task identification step S102, the authentication step S105, and the value estimation step S106. If the configuration is set so that these steps are performed simultaneously, communication to and from the characteristic acquisition mechanism 10 and reading the information of the data store 30 can be performed as one process. As a result, the evaluation process can be efficiently executed.

Furthermore, the execution sequences of the authentication step S105 and the value estimation step S106 are not limited to the sequence described above. Value estimation can be performed first in the value estimation step and then the authentication can be performed in the authentication step, or the authentication and value estimation can be performed simultaneously in one step. When only authentication is designated as the evaluation task, the value estimation step S106 does not execute. In contrast, when only a value estimation is designated as the evaluation task, the authentication step S105 does not execute.

Additionally, although the product X was evaluated to be either a genuine product or a counterfeit product in the authentication steps S5 and S105 in the first and second embodiments, when the product X can be determined to be neither a genuine product nor a counterfeit product, the evaluation result of "manual confirmation required" can be output and the evaluation can be performed manually by an appraiser or the like.

Next, the third embodiment of the present invention will be described. The database configuration and the process flow in the third embodiment are identical to those of the first embodiment and the second embodiment and therefore will be omitted. The system organization of the product evaluation system 1 of the third embodiment will be described using FIG. 11.

Figure 11:
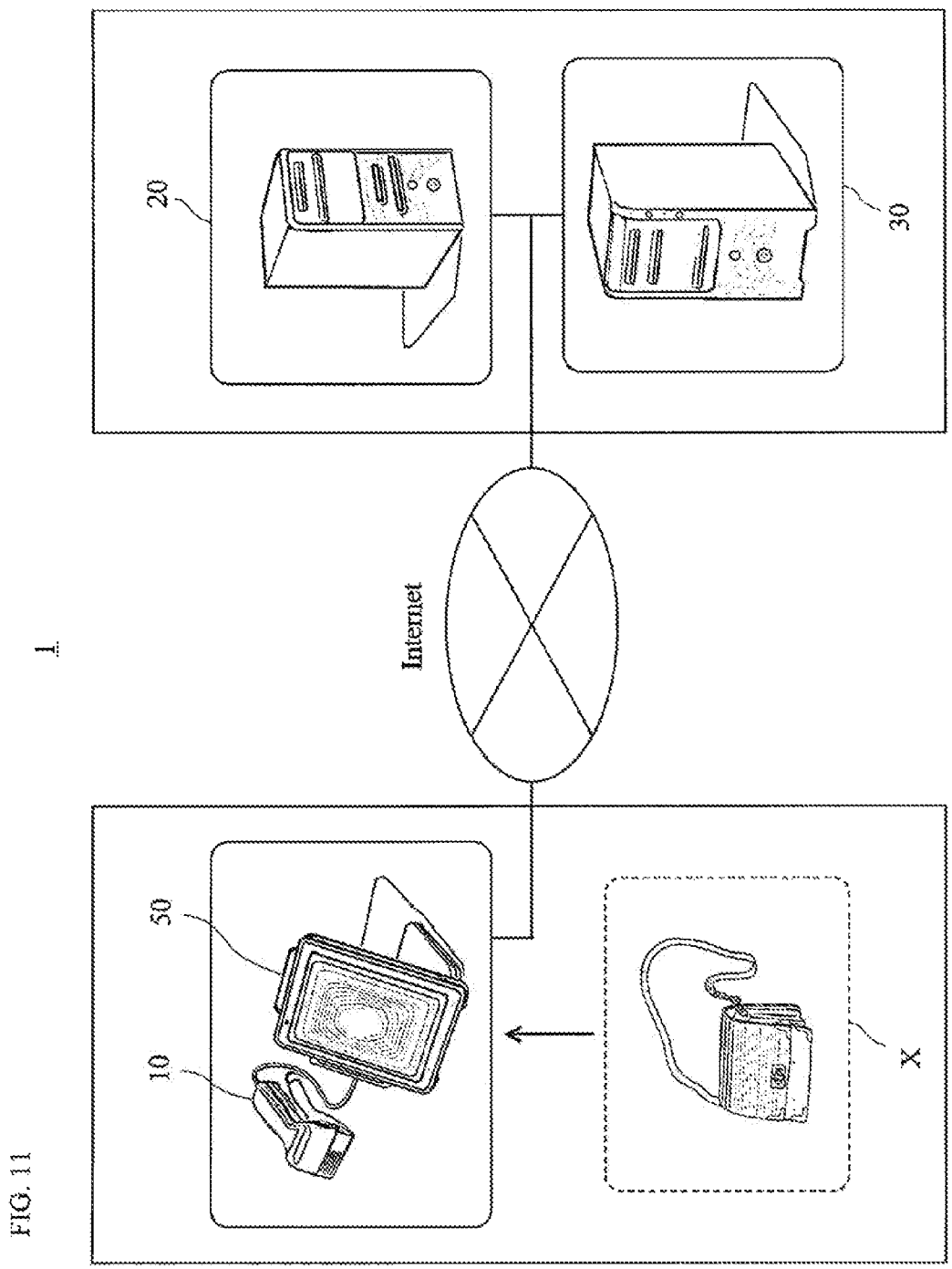
FIG. 11 is a schematic block view of the product evaluation system related to the third embodiment of the present invention.

As shown in FIG. 11, the product evaluation system 1 of this embodiment is comprised such that the evaluation mechanism 20 and the data store 30 are installed and administered together at a control location, such as an information processing center. The characteristic acquisition mechanism 10 that acquires the characteristics of the product X targeted for evaluation and the I/O component 50 that outputs the evaluation result are installed at a remote location. These devices are connected by a wide area communication network, such as the Internet, and the evaluation of the product X is performed at the remote location. By way of using this type of configuration, it is possible to connect a center with multiple remote locations. As a result, the resources of the evaluation mechanism 20 and the data store 30 installed at the center are effectively utilized.

An example of using this type of product evaluation system 1 is a utilization method in which an appraiser of used goods is evaluating individual products one by one. As shown in FIG. 11, a scanner, functioning as the characteristic acquisition mechanism 10, and a display, functioning as the I/O component 50, installed at an evaluation location are an example of a possible hardware configuration.

As described above, according to the product evaluation system and product evaluation method according to various embodiments of the present invention, the characteristic acquisition mechanism 10 acquires the characteristic information of the product targeted for evaluation and then compares this characteristic information to information related to genuine values of genuine products and/or counterfeit values of counterfeit products registered beforehand thereby allowing the system to evaluate whether or not the product is a genuine product. As a result, people without special expertise or experience can perform the authentication. Additionally, when evaluating large amounts of products, the risk of mistakes is very small and the accuracy of evaluations is higher. Furthermore, it is not necessary for the manufacturer or the distributor to attach information, such as markers, to products beforehand and products can be evaluated in their present state. Even further, the value of a genuine product can also be evaluated.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The present invention may be described in terms of functional block components and various processing steps. Such functional blocks may be realized by any number of hardware and/or software components configured to perform the specified functions. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

The invention claimed is:

1. A product evaluation system, comprising:
a characteristic acquisition device that acquires characteristic information of a product, wherein the characteristic acquisition device comprises at least one device compatible with the product type identified by a product identifier selected from at least one of the group consisting of a radiographic test device, a fluorescent X-ray analysis device, an ultraviolet absorption analysis device, an image enlargement processing device, a surface roughness measurement device, an infrared light absorption/penetration analysis device, an acoustic frequency analysis device, an odor sensor, and a reflection coefficient measurement device; and
a computer that evaluates a product,
the computer comprising:
a product information memory that stores a product type of a product including at least one of a product, a product group, a product brand and a product category, and identification information of the product;
a characteristic acquisition method memory that stores an acquisition method for acquiring characteristic information corresponding to the product;
the product identifier that identifies a product type of a product targeted for evaluation including at least one of a product, a product group, a product brand, or a product category, based on input information;
a genuine product characteristic information memory that stores genuine product characteristic information of the product;
a counterfeit product characteristic information memory that stores genuine product characteristic information of the product;
a product condition memory that stores value information for each condition of the product;
a market information memory that stores market information corresponding to the value information of the product;
an evaluation task memory that stores a type of evaluation including any one of authentication, a value estimation, or authentication and a value estimation;
an evaluation task acquisition unit that acquires the type of evaluation from the evaluation task memory; and
an evaluation unit that performs a predetermined evaluation of the product targeted for evaluation,
wherein:
the evaluation unit acquires the identification information of the product targeted for evaluation from the product information memory based on the product type identified by the product identifier, acquires the characteristic acquisition method for the product targeted for evaluation from the characteristic acquisition method memory based on the identification information, and acquires the characteristic information of the product targeted for evaluation from the characteristic acquisition device compatible with the characteristic acquisition method;
the evaluation unit references the type of evaluation acquired by the evaluation task acquisition unit;
when the type of evaluation includes the authentication, the evaluation unit performs the authentication by acquiring at least one of the genuine product characteristic information and the counterfeit product characteristic information of the product targeted for evaluation with reference to at least one of the genuine product characteristic information memory and the counterfeit product characteristic information memory based on the identification information of the product targeted for evaluation, and by comparing the acquired at least one of the genuine product characteristic information and the counterfeit product characteristic information with the characteristic information of the product targeted for evaluation acquired from the characteristic acquisition device;
when the type of evaluation includes the value estimation, the evaluation unit performs the value estimation by acquiring the value information of the product targeted for evaluation from the product condition memory based on the identification information of the product targeted for evaluation and the characteristic information related to the condition of the product targeted for evaluation acquired from the characteristic acquisition device, and by acquiring the market information of the product targeted for evaluation with reference to the market information memory based on the acquired value information; and
when the evaluation unit evaluates that the product targeted for evaluation is a counterfeit product, the characteristic information of the product targeted for evaluation is saved in the counterfeit product characteristic information memory.

2. The product evaluation system according to claim 1, wherein:
the market information is a market value; and
a sales price of the product targeted for evaluation is determined based on the market value in the value estimation.

3. The product evaluation system according to claim 1, wherein:
the computer comprises the genuine product characteristic information memory that stores genuine product characteristic information of the product;
the product information memory further includes characteristic information of the product; and
the product identifier identifies the product type of the product targeted for evaluation with reference to at least one of the product information memory and the genuine product characteristic information memory based on the characteristic information input from the characteristic acquisition device.

4. The product evaluation system according to claim 1, wherein at least one of the genuine product characteristic information memory and the counterfeit product characteristic information memory is updated based on the characteristic information of the product targeted for evaluation acquired from the characteristic acquisition device.

5. The product evaluation system according to claim 1, wherein the product evaluation system continuously evaluates a plurality of products.

6. The product evaluation system according to claim 1, wherein the characteristic acquisition device and the computer are included in a single apparatus.

7. A product evaluation method that evaluates products using a characteristic acquisition device acquiring characteristic information of a product, wherein the characteristic acquisition device comprises at least one device compatible with the product type identified in identifying the product type of the product targeted for evaluation, selected from at least one of the group consisting of a radiographic test device, a fluorescent X-ray analysis device, an ultraviolet absorption analysis device, an image enlargement processing device, a surface roughness measurement device, an infrared light absorption / penetration analysis device, an acoustic frequency analysis device, an odor sensor, and a reflection coefficient measurement device; and a computer comprising:

a product information memory that stores a product type of a product including at least one of a product, a product group, a product brand, and a product category, and identification information of the product;

a characteristic acquisition method memory that stores an acquisition method for acquiring characteristic information corresponding to the product;

the product identifier that identifies a product type of a product targeted for evaluation including at least one of a product, a product group, a product brand, or a product category, based on input information;

a genuine product characteristic information memory that stores genuine product characteristic information of the product;

a counterfeit product characteristic information memory that stores genuine product characteristic information of the product;

a product condition memory that stores value information for each condition of the product;

a market information memory that stores market information corresponding to the value information of the product;

an evaluation task memory that stores a type of evaluation including any one of authentication, a value estimation, or authentication and a value estimation;

the method comprising:

acquiring, by the computer, the type of evaluation from the evaluation task memory;

identifying, by the computer, a product type of a product targeted for evaluation including at least one of a product, a product group, a product brand, or a product category, based on input information;

acquiring, by the computer, the identification information of the product targeted for evaluation from the from the product information memory based on the product type identified in the identifying the product type of the product targeted for evaluation, and acquiring the characteristic acquisition method for the product targeted for evaluation from the characteristic acquisition method memory based on the identification information;

acquiring, by the computer, the characterization information of the product targeted for evaluation from the characteristic acquisition device compatible with the characteristic acquisition method acquired in the acquiring the characteristic acquisition method; and performing, by the computer, a predetermined evaluation of the product targeted for evaluation using the characteristic information acquired in the acquiring the characteristic information for the product targeted for evaluation, wherein:

when the type of evaluation acquired in the acquiring the type of evaluation includes the authentication, in the performing evaluation of the product targeted for evaluation, the computer acquires at least one of the genuine product characteristic information and the counterfeit product characteristic information of the product targeted for evaluation with reference to at least one of the genuine product characteristic information memory and the counterfeit product characteristic information memory based on the identification information of the product targeted for evaluation, and compares the acquired at least one of the genuine product characteristic information and the counterfeit product characteristic information with the characteristic information of the product targeted for evaluation acquired in the acquiring the characteristic information of the product targeted for evaluation, and thereby performs the authentication;

when the type of evaluation acquired in the acquiring the type of evaluation includes the value estimation, in the performing evaluation of the product targeted for evaluation, the computer acquires the value information of the product targeted for evaluation from the product condition memory based on the identification information of the product targeted for evaluation and the characteristic information related to the condition of the product targeted for evaluation acquired in the acquiring the characteristic information of the product targeted for evaluation, and acquired the market information of the product targeted for evaluation with reference to the market information memory based on the acquired value information, and thereby performs the value estimation; and when the product targeted for evaluation is evaluated as a counterfeit product, the characteristic information of the product targeted for evaluation is saved in the counterfeit product characteristic information memory.

8. The product evaluation method according to claim 7, wherein:

the market information is a market value; and in the performing evaluation of the product targeted for evaluation, the computer determines a sales price of the product targeted for evaluation based on the market value.

9. The product evaluation method according to claim 7, wherein:

the computer comprises the genuine product characteristic information memory that stores genuine product characteristic information of the product;

the product information memory further includes characteristic information of the product; and in the identifying the product type of the product targeted for evaluation, the computer identifies the product type of the product targeted for evaluation with reference to at least one of the product information memory and the genuine product characteristic information memory based on the characteristic information acquired in the acquiring the characteristic information of the product targeted for evaluation.

10. The product evaluation method according to claim 7, wherein in the performing evaluation of the product targeted for evaluation, the computer updates at least one of the genuine product characteristic information memory and the counterfeit product characteristic information memory based on the characteristic information of the product targeted for evaluation acquired in the acquiring the characteristic information of the product targeted for evaluation.

11. The product evaluation method according to claim 7, wherein the product evaluation method continuously evaluates a plurality of products.

12. The product evaluation method according to claim 7, wherein the characteristic acquisition device and the computer are included in a single apparatus.

* * * * *